UNITED STATES PATENT OFFICE.

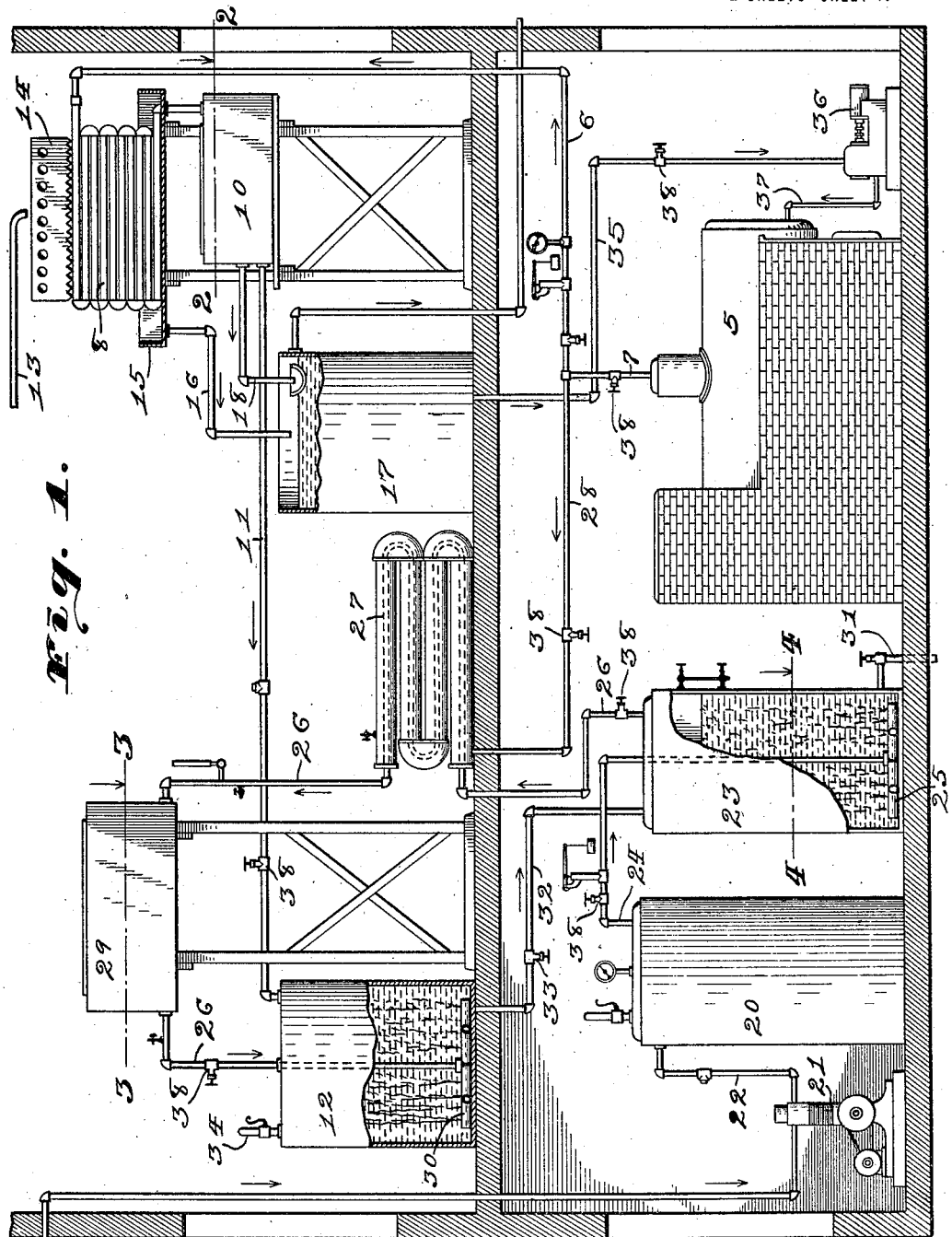

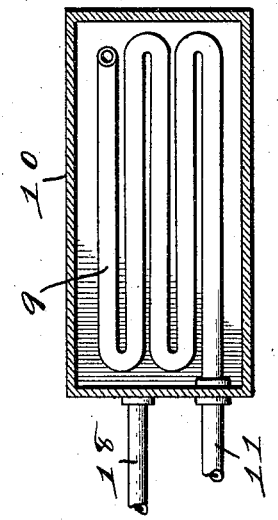
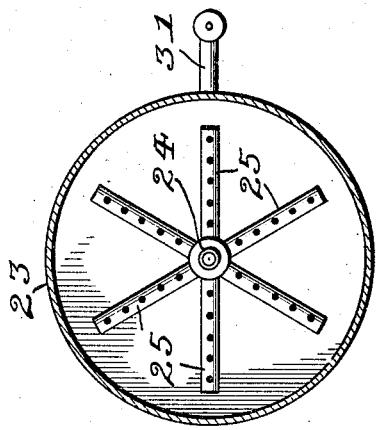
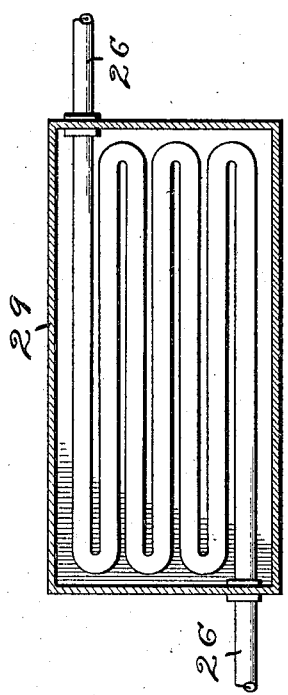

JOE F. QUIGLEY, OF OKLAHOMA, OKLAHOMA.

APPARATUS FOR PURIFYING AND AERATING WATER.

1,161,971.  Specification of Letters Patent.  Patented Nov. 30, 1915.

Application filed July 10, 1914. Serial No. 850,087.

*To all whom it may concern:*

Be it known that I, JOE F. QUIGLEY, a citizen of the United States, residing at Oklahoma city, in the county of Oklahoma and State of Oklahoma, have invented certain new and useful Improvements in Apparatus for Purifying and Aerating Water, of which the following is a specification, reference being had to the accompanying drawings.

Water may be sterilized and purified by reducing it to steam and then condensing, but after being thus treated does not have the taste of natural well water.

An object, therefore, of the invention is to provide means for restoring to the water its natural taste.

Other objects and advantages of the invention will be set forth in the ensuing description.

One embodiment of the invention in practical form is shown by the accompanying drawings, in which:—

Figure 1 is a sectional view of a building, showing the apparatus installed therein. Fig. 2 is an enlarged sectional view taken on the line 2—2 of Fig. 1. Fig. 3 is a sectional view taken on the line 3—3 of Fig. 1. Fig. 4 is a sectional view taken on the line 4—4 of Fig. 1.

Referring to the several figures, in all of which like characters of reference designate like parts, the apparatus shown includes a steam boiler 5. Steam is taken from the boiler 5 through one branch 6 of a pipe 7 to a condensing-coil 8, and, after condensation, is passed through a cooling-coil 9 in a refrigeration-chest 10 and on in its condensed state through a pipe 11 into a storage-tank 12. To reduce the temperature of the condensing-coil 8, cold water is supplied from any suitable source through a pipe 13 to a shallow trough 14. This water flows down over the condensing-coil 8 and is collected in a pan 15, from which it is carried by a pipe 16 into a second storage-tank 17. The water resulting from ice in the refrigeration-chest 10 is also carried into the second storage-tank 17 through a pipe 18, an over-flow pipe 19 being provided to carry away the surplus water.

The apparatus thus described is in common use.

In attaining the objects stated, the inventor has provided improved means for aerating the sterilized and purified water; means for sterilizing the air used in the aerating; means for cooling said air after sterilization and before aerating; and means for preventing contamination of the purified and aerated water by the atmosphere.

In providing the aerating means, a tank 20 or other suitable source of compressed air is provided, and an air-compressor 21 keeps said tank filled through a pipe 22.

Through pipes and other connections later described, air is conducted from the tank 20 to the lower part of the interior of the storage-tank 12 and allowed to bubble up through the purified water therein to aerate it. This air, before entering the purified and cooled water in the storage-tank 12, is first washed of impurities and sterilized by heating, and is again cooled in order to readily mix with the cooled water.

To wash the air, a washing-tank 23 is provided and a pipe 24 leads from the air tank 20 to the lower part of the interior of said washing-tank, the lower or delivery end of this pipe having perforate branches 25 from which the air may bubble up through the water and be washed. The air thus passed through the washing-tank 23 is conducted through a pipe 26 which passes through a heating-coil 27, and steam is supplied to this heating-coil from the boiler 5 through the opposite branch 28 of the pipe 7 aforesaid. After passing through the heating-coil 27, the pipe 26 passes through a cooling-chest 29 to cool the air and then passes to the lower part of the interior of the storage-tank 12 where it terminates in perforate branches 30 and delivers the washed, sterilized, and cooled air to bubble up through the purified and aerated water. The water in the washing-tank 23 will in time become contaminated by the air passing through it, and when this occurs the water may be drawn off through a valved outlet pipe 31. The washing-tank 23 may then be re-filled with pure water from the storage-tank 12; and for this purpose a pipe 32, having a valve 33 for closing it, leads from said tank 12 to the washing-tank 23. The top of the storage-tank 12 is closed to prevent atmospheric air from contaminating the purified and aerated water, and is provided with a yieldable valve 34 through which the air forced into said storage-tank for aeration purposes may escape. This valve 34 may be set to open at a pressure of, say, one pound per inch, thereby maintaining a pressure of that amount in the storage-tank 12 against which atmospheric air will not enter.

The water in the second storage-tank 17 may be carried through a pipe 35 to a pump 36, and fed by said pump through a pipe 37 into the boiler 5.

Valves 38 may be provided in the different pipes named, so that if necessary they may be closed for repair or other purposes.

Having thus described the invention, I claim:—

An apparatus for purifying and aerating water, including a boiler, a condenser, a steam pipe leading from the boiler to the condenser, a closed storage tank receiving the distilled water from the condenser, a compressed air tank, a washer receiving the air from the tank, an air cooling chest, a pipe leading from the washer to the air cooling chest, a heating coil surrounding a portion of the said pipe between the washer and cooling chest, a steam pipe establishing communication between the heating coil and the boiler, means for leading the air from the cooling chest to the storage tank and causing it to bubble upwardly through the water therein, and a check valve applied to the storage tank for permitting the escape of the air when an excessive pressure is reached.

Witness my hand this 13 day of June, 1914.

JOE F. QUIGLEY.

Witnesses:
J. M. WHEELER,
A. M. BOLES.